(12) United States Patent
Jesse

(10) Patent No.: US 12,103,501 B2
(45) Date of Patent: Oct. 1, 2024

(54) SYSTEM AND METHOD FOR VEHICLE SENSOR PRECIPITATION AND DEBRIS DEFLECTION

(71) Applicant: BNSF Railway Company, Fort Worth, TX (US)

(72) Inventor: Phillip W. Jesse, Albuquerque, NM (US)

(73) Assignee: BNSF Railway Company, Fort Worth, TX (US)

( * ) Notice: Subject to any disclaimer, the term of this patent is extended or adjusted under 35 U.S.C. 154(b) by 104 days.

(21) Appl. No.: 17/932,933

(22) Filed: Sep. 16, 2022

(65) Prior Publication Data

US 2024/0092317 A1    Mar. 21, 2024

(51) Int. Cl.
*B60S 1/56* (2006.01)
*B60S 1/54* (2006.01)

(52) U.S. Cl.
CPC .. *B60S 1/56* (2013.01); *B60S 1/54* (2013.01)

(58) Field of Classification Search
CPC ..................................... B60S 1/56; B60S 1/54
USPC .................................................. 348/373–375
See application file for complete search history.

(56) References Cited

U.S. PATENT DOCUMENTS

| 7,066,663 | B2 | 6/2006 | Cheng | |
|---|---|---|---|---|
| 7,726,821 | B2* | 6/2010 | Bral | A61B 1/126 359/507 |
| 8,586,896 | B2 | 11/2013 | Reichle | |
| 9,126,534 | B2* | 9/2015 | Snider | B60S 1/0848 |
| 9,663,073 | B2* | 5/2017 | Tanaka | B60S 1/56 |
| 10,384,697 | B2 | 8/2019 | Mesher | |
| 11,226,540 | B2 | 1/2022 | Duke | |

(Continued)

FOREIGN PATENT DOCUMENTS

| CN | 204346369 U | 5/2015 |
|---|---|---|
| CN | 111204360 B | 11/2020 |

(Continued)

OTHER PUBLICATIONS

Steven Tait, Vision helps spot failures on the rail, Jan. 12, 2015.

*Primary Examiner* — Lin Ye
*Assistant Examiner* — Chan T Nguyen
(74) *Attorney, Agent, or Firm* — Whitaker Chalk Swindle & Schwartz PLLC; Enrique Sanchez, Jr.; Bradley J. Birchfield

(57) ABSTRACT

A precipitation shield device, and/or methods of manufacturing and/or using the shield device are provided. The shield device of embodiments includes functionality to prevent accumulation of precipitation over an imaging sensor. In embodiments, the shield device includes a base that enables the shield device to be mounted onto an imaging sensor. A shield body may be defined by two end walls and two lateral walls disposed around a central opening of the shield body. During operation, the central opening is aligned with a window of the imaging sensor. In embodiments, the end walls may have a surface configured to control an airflow flowing over the shield device to create a vortex over the central opening of the shield device. In embodiments, the vortex created over the central opening may deflect precipitation away from the central opening and may prevent the precipitation from accumulating over the window of the imaging sensor.

20 Claims, 9 Drawing Sheets

(56) References Cited

U.S. PATENT DOCUMENTS

| | | | |
|---|---|---|---|
| 2015/0203077 A1* | 7/2015 | Gokan | B05B 7/08 |
| | | | 134/102.2 |
| 2015/0353024 A1* | 12/2015 | Cooper | B60R 11/04 |
| | | | 348/148 |
| 2017/0036650 A1* | 2/2017 | Hester | B60S 1/52 |
| 2019/0297750 A1* | 9/2019 | Suzuki | H05K 7/20945 |
| 2021/0223665 A1 | 7/2021 | Kuroki | |
| 2021/0387579 A1 | 12/2021 | Jo et al. | |
| 2022/0135005 A1* | 5/2022 | Yautz | B60S 1/54 |
| | | | 134/37 |

FOREIGN PATENT DOCUMENTS

| | | |
|---|---|---|
| CN | 110032023 B | 8/2021 |
| DE | 102015015910 B3 | 6/2017 |
| KR | 20190002675 U | 10/2019 |
| WO | 2021239325 A1 | 12/2021 |

* cited by examiner

SYSTEM AND METHOD FOR VEHICLE SENSOR PRECIPITATION AND DEBRIS DEFLECTION

TECHNICAL FIELD

The present disclosure relates generally to physical shield devices, and more particularly to devices configured to control an airflow over a sensor to shield the sensor from precipitation.

BACKGROUND

Imaging sensing technology has enabled remarkable functionality for various technology fields. One particular technology field that has benefited greatly from imaging sensing technology includes object mapping, in which the geometry of an object is mapped using imaging sensing technology. One example application of object mapping includes measuring the geometry of railroad assets. In this application, an imaging sensor is used to measure, detect, or otherwise map the geometry of a railroad asset, such as, for example, any component of a railroad track, which may include the alignment of the track components (e.g., the vertical, lateral, and horizontal position of the track components), the gauge of the railroad track, the size of the railroad track, the wear of the railroad track, the cant of the railroad track, and/or any other measure of the geometry and/or shape of the railroad track asset. This geometric mapping data may be used to make determinations as to the condition and/or state of the railroad track assets and may be used to make determinations as whether a railroad track asset may require maintenance, repair, replacement, alignment, etc.

However, current imaging sensors that are used to geometrically map railroad assets may be susceptible to weather conditions. In particular, railroad asset mapping may take place in environments with very bad weather, and at high speeds (e.g., speeds of up to, and sometimes exceeding, 70 miles per hour). As such, current imaging sensors may be susceptible and tend to accumulate precipitation (e.g., snow, rain, dirt, and/or other particles) in the windows of the imaging sensor that may obscure or otherwise affect the vision of the imaging sensor. For example, some imaging sensors may include a laser and a camera, in which a laser beam may sweep of the target object (e.g., the object being mapped) and the camera may capture the reflection of the laser beam sweep. The image captured by the camera may be processed to determine, based on the laser beam reflection, various geometric measurements of the target object. However, when precipitation accumulates over a window of the laser, the laser, which is a coherent visible light source, may be obstructed and may not be able to sweep over the target object. In a similar manner, when precipitation accumulates over a window of the camera, the camera may be obstructed from capturing an image of the laser beam reflections over the target object. As such, precipitation may prevent the imaging sensor from operating effectively.

Solutions have been proposed to prevent accumulation of precipitation over the window of an imaging sensor. Some solutions have proposed an enclosure over the imaging sensor. However, such a solution is bulky, creating greater demands for space, expensive, as it encloses the entire imaging sensor, and creates greater maintenance demands. As such, this solution is not ideal. Another solution that has been proposed includes a plate that mounts over the imaging sensor and includes a window through which the camera may be able to "see." However, such as solution is not very effective, as it does not significantly prevent precipitation accumulation.

SUMMARY

The present disclosure achieves technical advantages as a precipitation shield device, and/or methods of manufacturing and/or using a precipitation shield device, that includes functionality to prevent accumulation of precipitation and debris over an imaging sensor. In particular embodiments, the precipitation shield device of embodiments may include a base and a shield body. The shield body may be defined by two end walls and two lateral walls disposed around a central opening of the shield body. In embodiments, the base may be configured to enable the precipitation shield device to mount onto an imaging sensor such that the central opening of the precipitation shield device is aligned with a window of the imaging sensor. In embodiments, the base may include at least one mounting tab that is configured to facilitate installation of a fastening mechanism to the shield body to secure the shield body to the imagining sensor. In embodiments, at least one of the end walls of the shield body may have a surface configured to control an airflow flowing over the precipitation shield device to create a vortex over the central opening of the precipitation shield device. For example, a surface of the at least one of the end walls of the shield body may have an upward slope relative to the direction of the airflow over the precipitation shield device. The upwardly sloped surface of the at least one of the end walls of the shield body may cause air flowing over the upwardly sloped surface to flow faster than the air flowing above the precipitation shield device, which may cause the vortex to be created over the central opening of the precipitation shield device. In embodiments, the vortex created over the central opening of the precipitation shield device may deflect precipitation away from the central opening and may prevent the precipitation from accumulating over the window of the imaging sensor.

In embodiments, the precipitation shield device may be configured to receive injected air in the central opening of the precipitation shield device from an air injection system to augment the vortex created over the central opening of the precipitation shield device. The augmentation of the vortex provides a boost or increase to the deflecting pressure or force of the vortex against the precipitation further improving the functionality of the precipitation shield device to prevent the precipitation from accumulating over the window of the imaging sensor.

As such, precipitation shield devices implemented in accordance with embodiments of the present disclosure may prevent obstructions on the windows of the imaging sensor and may allow the imaging sensor to conduct efficient and effective geometric mapping operations without interference of precipitation on the imaging sensor visibility.

It is an object of the disclosure to provide a precipitation shield device that includes functionality to prevent accumulation of precipitation over an imaging sensor. It is a further object of the disclosure to provide a method of manufacturing a precipitation shield device configured to prevent accumulation of precipitation over an imaging sensor. It is still a further object of the disclosure to provide a method of using a precipitation shield device to prevent accumulation of precipitation over an imaging sensor.

In one particular embodiment, a precipitation shield device is provided. The precipitation shield device includes a shield body defined by two end walls and two lateral walls disposed around a central opening of the precipitation shield device, and a base configured to support the shield body and configured to facilitate mounting of the precipitation shield device onto an imaging sensor such that the central opening of the precipitation shield device is aligned over a window of the imaging sensor. In embodiments, at least one of the end walls may have a surface configured to control an airflow flowing over the precipitation shield device to create a vortex over the central opening of the precipitation shield device. In embodiments, the vortex may deflect precipitation away from the central opening of the precipitation shield device and may prevent the precipitation from accumulating over the window of the imaging sensor.

In another embodiment, a method of manufacturing a precipitation shield device is provided. The method includes disposing two end walls and two lateral walls defining a shield body around a central opening of the precipitation shield device and forming a base with at least one mounting element. In embodiments, the at least one mounting element may be configured to enable the shield body to mount onto an imaging sensor such that the central opening of the precipitation shield device is aligned over a window of the imaging sensor. The method also includes configuring a surface of at least one of the end walls to control an airflow flowing over the precipitation shield device to create a vortex over the central opening of the precipitation shield device. In embodiments, the vortex may deflect precipitation away from the central opening of the precipitation shield device and may prevent the precipitation from accumulating over the window of the imaging sensor.

In yet another embodiment, a method of preventing accumulation of precipitation over an imaging sensor is provided. The method includes mounting a precipitation shield device onto an imaging sensor. In embodiments, a shield body of the precipitation shield device may be defined by two end walls and two lateral walls disposed around a central opening of the precipitation shield device. The method also includes aligning a central opening of the precipitation shield device over a window of the imaging sensor. In embodiments, at least one of the end walls of the shield body may have a surface configured to control an airflow flowing over the precipitation shield device to create a vortex over the central opening of the precipitation shield device. In embodiments, the vortex may deflect precipitation away from the central opening of the precipitation shield device and may prevent the precipitation from accumulating over the window of the imaging sensor. The method further includes injecting air into the central opening of the precipitation shield device at an injection angle configured to augment the vortex over the central opening of the precipitation shield device.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

Figure 1A:
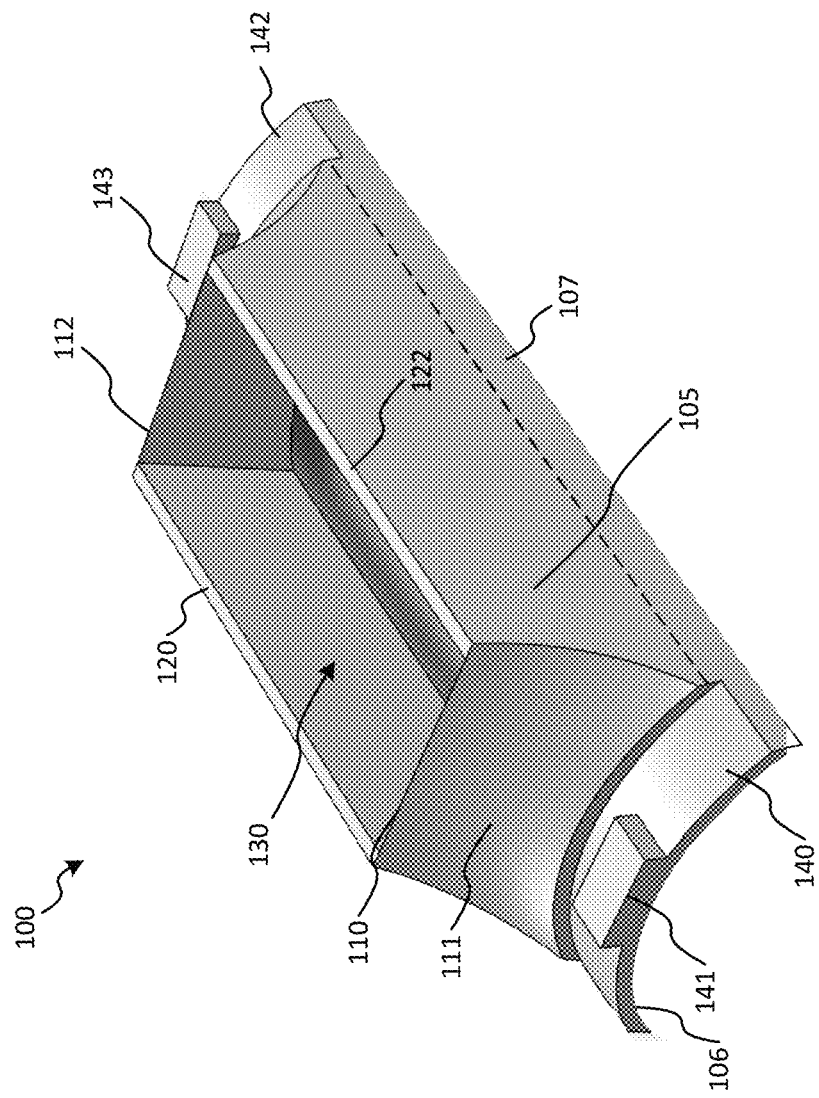
FIG. 1A shows an exemplary precipitation shield device configured with capabilities and functionality for preventing accumulation of precipitation over an imaging sensor in accordance with embodiments of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, as evidenced by issuance of this patent, the prior art fails to disclose or teach the elements and limitations presented in the claims as enabled by the specification and drawings, such that the presented claims are patentable under the applicable laws and rules of this jurisdiction.

Various embodiments of the present disclosure are directed to a precipitation shield device, and/or methods of manufacturing and/or using a precipitation shield device, that includes functionality to prevent accumulation of precipitation over an imaging sensor. In particular embodiments, the precipitation shield device of embodiments may include a base and a shield body. The shield body may be defined by two end walls and two lateral walls disposed around a central opening of the shield body. In embodiments, the base may be configured to enable the precipitation shield device to mount on an imaging sensor such that the central opening of the precipitation shield device is aligned with a window of the imaging sensor. In embodiments, the base may include at least one mounting tab configured to facilitate installation of a fastening mechanism to the shield body to secure the shield body to the imagining sensor. In embodiments, at least one of the end walls of the shield body may have a surface configured to control an airflow flowing over the precipitation shield device to create a vortex over the central opening of the precipitation shield device. In embodiments, the vortex created over the central opening of the precipitation shield device may deflect precipitation away from the central opening and may prevent the precipitation from accumulating over the window of the imaging sensor.

In embodiments, the precipitation shield device may be configured to receive injected air in the central opening of the precipitation shield device from an air injection system to augment the vortex created over the central opening of the precipitation shield device. The augmentation of the vortex provides a boost or increase to the deflecting pressure or force of the vortex against the precipitation further improving the functionality of the precipitation shield device to prevent the precipitation from accumulating over the window of the imaging sensor.

As used herein, precipitation may refer to any material, particulate, or substance that may accumulate, obscure, and/or otherwise affect the vision of an imaging sensor. Non-exhaustive examples of precipitation may include rain, snow, dirt, oil, grease, debris, and/or other substances or materials.

As used herein, a target object may refer to an object being mapped or inspected using an imaging sensor, such as geometrically mapped or inspected. For example, a target object may include a target railroad asset, such as a railroad track being geometrically mapped using an imaging sensor.

FIG. 1A shows an exemplary precipitation shield device 100 configured with capabilities and functionality for preventing accumulation of precipitation over an imaging sensor in accordance with embodiments of the present disclosure. As shown in FIG. 1A, precipitation shield device 100 include shield body 105 and base 107, and these components may be configured to include various components and/or configurations for providing functionality as described in various embodiments of the present disclosure.

Figure 1B:
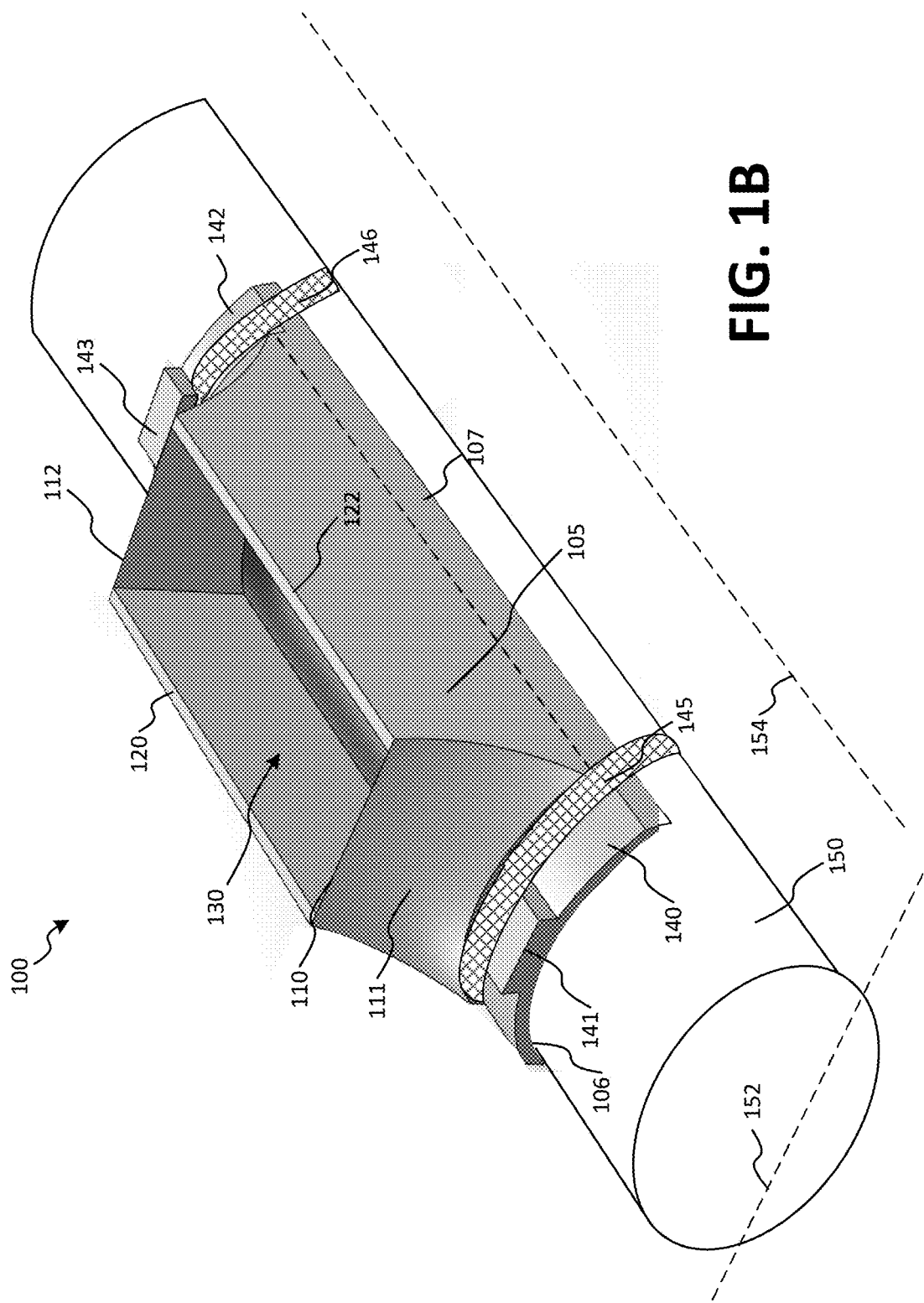
FIG. 1B shows an exemplary precipitation shield device installed on an imaging sensor and configured with capabilities and functionality for preventing accumulation of precipitation over the imaging sensor in accordance with embodiments of the present disclosure.
Figure 1C:
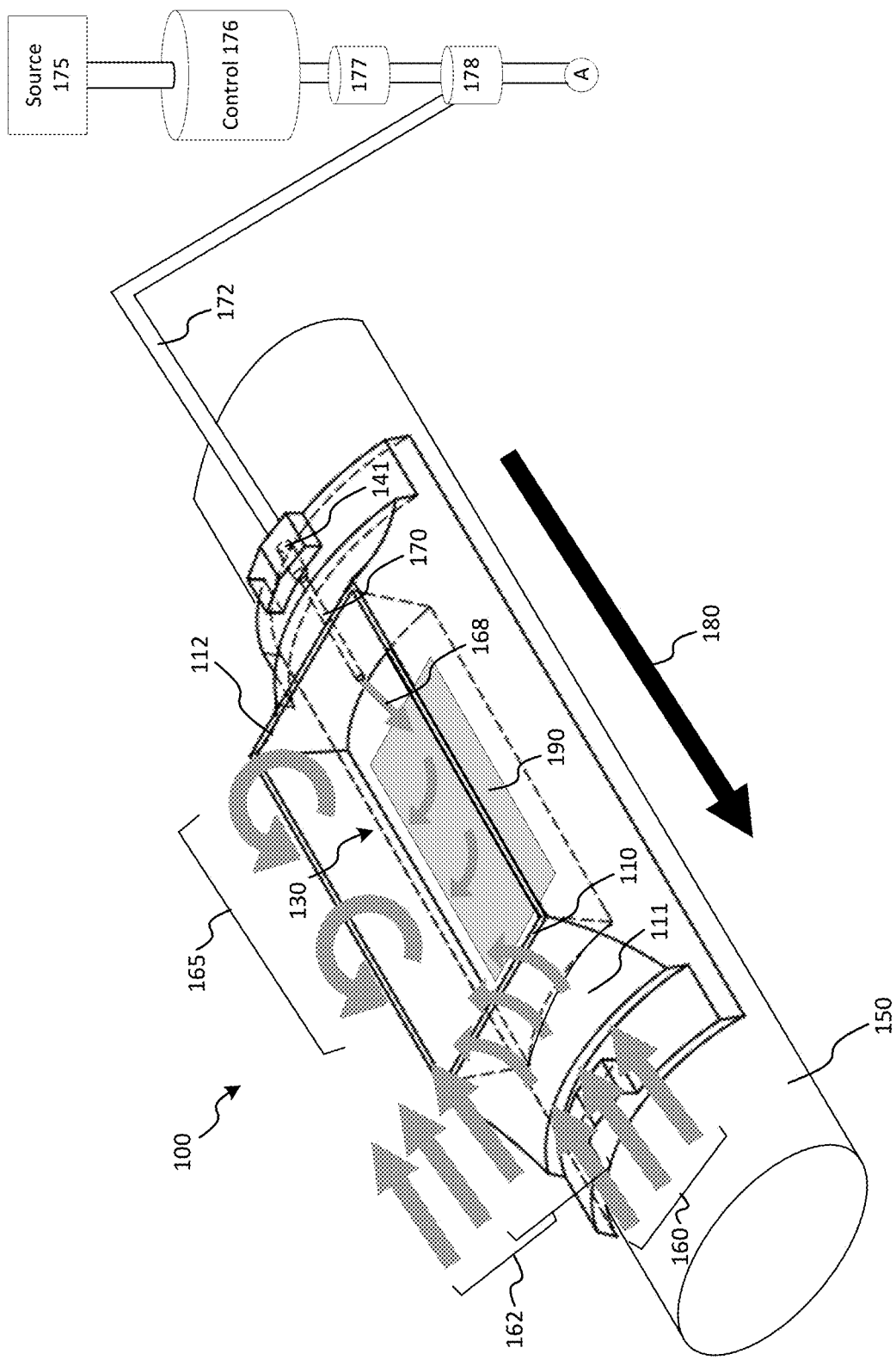
FIG. 1C shows another view of an exemplary precipitation shield device installed on an imaging sensor during operations and configured with capabilities and functionality for preventing accumulation of precipitation over the imaging sensor in accordance with embodiments of the present disclosure.

What follows is a more detailed discussion of precipitation shield device 100 as shown in FIG. 1A. The discussion of precipitation shield device 100 will be further based on the examples illustrated in FIGS. 1B and 1C. FIG. 1B shows an exemplary precipitation shield device 100 installed on an imaging sensor and configured with capabilities and functionality for preventing accumulation of precipitation over the imaging sensor in accordance with embodiments of the present disclosure. FIG. 1C shows another view of exemplary precipitation shield device 100 installed on an imaging sensor during operations and configured with capabilities and functionality for preventing accumulation of precipitation over the imaging sensor in accordance with embodiments of the present disclosure.

In embodiments, as shown in FIG. 1B, precipitation shield device 100 may be configured to be mounted onto an imaging sensor (such imaging sensor 150). It is noted that FIG. 1B shows an upside-down perspective view of precipitation shield device 100 installed on imaging sensor 150, and in particular over a window of imaging sensor 150. During operation, imaging sensor 150 may be installed onto a railroad train or engine in a manner such that precipitation shield device 100 and the window of imaging sensor 150 over which precipitation shield device 100 is installed may be pointing in a general downward direction toward a target railroad asset.

In embodiments, precipitation shield device 100 may be configured to be removable. In this manner, precipitation shield device 100 may be usable when inclement weather or bad conditions is or are expected that may affect the visibility of imaging sensors. For example, precipitation shield device 100 may be installed onto imaging sensor 150 that is to be used in an area where precipitation may be expected (e.g., in a cold weather area, when a storm is expected, when expected track conditions indicate increased precipitation, etc.). When the bad conditions are no longer expected, precipitation shield device 100 may be removed from imaging sensor 150.

In embodiments, at least a portion of precipitation shield device 100 may be of a sufficiently strong material to withstand operations on a railroad vehicle (e.g., a train car, a locomotive, an engine, etc.) while exposed to the elements. In particular, it is noted that some operations of precipitation shield device 100 may include prevention of precipitation accumulation on railroad assets imaging sensors. These railroad assets imaging sensors may be installed on the underside of train cars or train engines and typically may be exposed to the elements in order to have visibility of the target railroad assets. For example, a typical application of these railroad assets imaging sensors may include geometric mapping of railroad tracks. In these cases, imaging sensor 150 may be installed on the underside of a train car in order to provide access and visibility of the target railroad track to imaging sensor 150. It is also for these reasons that these imaging sensors are susceptible to the elements and in particular to accumulation of precipitation on the windows of these imaging sensors.

In embodiments, at least a portion of precipitation shield device 100 may be constructed of plastic, metal, wood, resin, and/or any other rigid materials sufficiently rigid and/or strong to allow precipitation shield device 100 to maintain a preconfigured shape while also withstanding the elements, or any combination thereof. In embodiments, precipitation shield device 100 may be constructed using one or more of various construction methods, such as mold injection, three-dimensional (3D) printing, computerized numerical control (CNC) machining, and/or any other manufacturing method suitable to construct a precipitation shield device in accordance with embodiments of the present disclosure.

In embodiments, shield body 105 and base 107 may be physically separate components and/or may be constructed separately. In these cases, shield body 105 and base 107 may be joined together to form precipitation shield device 100. Shield body 105 and base 107 may be joined together using one or more of various techniques for joining components together and that may be suitable for the materials used to make shield body 105 and base 107.

In some embodiments, shield body 105 and base 107 may be of a unitary construction. For example, shield body 105 and base 107 may be functional constituents of a single component. As illustrated in FIG. 1A, shield body 105 and base 107 may be part of a single component and the separation between shield body 105 and base 107 may be functional. In some embodiments, a unitary construction for shield body 105 and base 107 may provide manufacturing benefits, such as reduced cost, reduced complexity of manufacturing process, as well as operational benefits, such as reduced maintenance requirements, as the points of failures might be reduced, and reduced installation requirements, as shield body 105 and base 107 may be pre-joined.

In embodiments, base 107 may be configured to support shield body 105. For example, shield body 105 may be positioned on top of base 107 in order to provide support for shield body 105 during operations. Base 107 may be configured to facilitate mounting of precipitation shield device 100 onto an imaging sensor (such as imaging sensor 150). For example, base 107 may be configured to be coupled to imaging sensor 150, such as by positioning base 107 onto the imagining sensor and securing base 107 to the imaging sensor. In embodiments, base 107 may include at least one mounting element (e.g., mounting element 140 and mounting element 142) configured to facilitate mounting of base 107 (and precipitation shield device 100) to the imaging sensor.

In embodiments, each of mounting elements 140 and 142 may be disposed at a respective end of base 107. For example, mounting element 140 may be disposed on the proximate end of base 107 and mounting element 142 may be disposed on the distal end of base 107. Each of mounting elements 140 and 142 may include a ridge, tab, surface, or area, configured to support and allow a fastening mechanism (e.g., such as a tie, clasp, clamp, etc.) to be positioned over a respective one of mounting elements 140 and 142, and over the imaging sensor, so as to secure base 107 (and precipitation shield device 100) to the imaging sensor. For example, as illustrated in FIG. 1B, precipitation shield device 100 may be mounted and secured onto imaging sensor 150 using tie straps 145 and 146. In this example, tie straps 145 and 146 may be positioned and secured over mounting elements 140 and 142, respectively, and around imaging sensor 150. In this manner, base 107 (and precipitation shield device 100) may be secured onto imaging sensor 150.

In some embodiments, each of mounting elements 140 and 142 may include a respective ridge configured to secure the fastening mechanism onto each of mounting elements 140 and 142. For example, mounting element 140 may include ridge 141, which may be configured to provide a stop or obstacle for tie strap 145 installed over mounting element 140 such that tie strap 145 may be stopped from sliding away from mounting element 140. Similarly, mounting element 142 may include ridge 143, which may be configured to provide a stop or obstacle for tie strap 146 installed over mounting element 142 such that tie strap 146 may be stopped from sliding away from mounting element 142.

It will be appreciated that the discussion herein of tie straps for securing the precipitation shield device of embodiments onto an imaging sensor is for illustrative purposes, and other fastening and/or securing components and/or methods are also envisioned by the present disclosure. As such, the use of tie straps in the present discussion should not be construed as limiting in any way.

In some embodiments, the bottom surface of each of mounting elements 140 and 142 may operate to provide further mounting points for base 107. For example, in some embodiments, the bottom surface of each of mounting elements 140 and 142 may be configured to include an adhesive surface (e.g., glue, adhesive tape, or any other adhesive substance) that may contact the imaging sensor and provide a further securing force securing base 107 onto the imaging sensor.

In embodiments, a bottom surface of base 107 (e.g., a surface opposite to a surface of base 107 onto which shield body 105 is positioned) may be configured with a shape configured to track the shape of imaging sensor 150 to which base 107 is to be coupled. For example, as shown in FIG. 1B, the surface of imaging sensor 150 may have a curvature of a first radius along latitudinal axis 152. As also shown, the surface of imaging sensor 150 along longitudinal axis 154 may not have a curvature and may instead be flat. In this case, the bottom surface of base 107 may be configured to substantially track the geometry of the surface of imaging sensor 150. For example, the bottom surface of base 107 may include a curvature 106 along cross axis 152 of precipitation shield device 100 that may have a radius that is substantially the same as the first radius of the surface of imaging sensor 150. In some embodiments, the curvature of the bottom surface of base 107 may include a curvature of mounting elements 140 and 142. In this manner, mounting elements 140 and 142 may be configured to track the geometry of imaging sensor 150 to facilitate mounting of precipitation shield device 100 onto imaging sensor 150. In this same example, the bottom surface of base 107 along longitudinal axis 154 may not include a curvature and may instead be flat, as illustrated.

In embodiments, base 107 may include an opening that defines, at least in part, a central opening 130 of precipitation shield device 100. This central opening 130 of precipitation shield device 100 may be configured to provide visibility to imagining sensor 150 through precipitation shield device 100 by maintaining an unobstructed and open area of precipitation shield device 100 through which imaging sensor 150 may have visibility of the target object. In embodiments, as discussed in more detail below, during operation, central opening 130 may be aligned over window 190 of imaging sensor 150.

In embodiments, shield body 105 may be configured to control an airflow flowing over precipitation shield device 100 to generate a vortex that is configured to prevent accumulation of precipitation over imaging sensor 150. In embodiments, shield body 150 may be defined by end walls 110 and 112, and lateral walls 120 and 122. In addition, end wall 110, end wall 112, lateral wall 120, and lateral wall 122 may disposed around central opening 130. In this manner, end wall 110, end wall 112, lateral wall 120, and lateral wall 122, in combination, may form a box around central opening 130. As will be described in more detail below, during operation, central opening 130 may be aligned over window 190 of imaging sensor 150. In this manner, central opening 130 may provide an open space or area that provides visibility to imaging sensor 150 through precipitation shield device 100 when precipitation shield device 100 is installed or mounted over imaging sensor 150.

In embodiments, end walls 110 and 112 and lateral walls 120 and 122 may be configured to provide stability to shield body 105. In embodiments, end walls 110 and 112 and lateral walls 120 and 122 may have a thickness configured to ensure that shield body 105 retains its shape during operations. A height of end walls 110 and 112 and lateral walls 120 and 122 may be configured to provide functionality in accordance with the present disclosure while also preventing interference with the visibility of imaging sensor 150. As will be appreciated, overly high end walls and/or lateral walls may prevent imaging sensor 150 from "seeing" the target objects.

In embodiments, the outer surface of lateral walls 120 and 122 may have a shape with a slight arcuate angle or may have a slight slope. The shape of the outer surface of lateral walls 120 and 122 may provide benefits such as optimizing the amount of materials required to construct shield body 105 by reducing the amount of materials used for lateral walls 120 and 122 while providing sufficient stability to shield body 105 based on the geometry of the surface of imaging sensor 150. In embodiments, the inner surface of lateral walls 120 and 122 may be flat and may not have an arcuate angle or slope.

In embodiments, at least one of end walls 110 and 112 may have a surface configured to control an airflow flowing over precipitation shield device 100 to create a vortex over central opening 130. In embodiments, the vortex created over central opening 130 may function to deflect precipitation away from central opening 130 and may prevent precipitation from accumulating over window 190 of imaging sensor 150. For example, in some embodiments, end wall 110 may have surface 111 that is specially shaped to create a vortex over central opening 130 during operations. The shape of surface 111 may be such that an airflow flowing over surface 110 is caused to flow faster than the airflow flowing above the precipitation shield device, which may cause the vortex to be generated over central opening 130.

It is noted that, the discussion that follows focuses on surface 111 of end wall 110. However, this is merely for illustrative purposes. Indeed, in some embodiments, a surface of end wall 112 may additionally or alternatively be configured for controlling the airflow to generate a vortex over central opening 130. In these cases, precipitation shield device 100 may be installed onto imaging sensor 150 such that the airflow flowing over precipitation shield device 100 impacts end wall 112 first, before end wall 110. As such, it is cautioned that the discussion herein with respect to surface 111 of end wall 110 should not be construed as limiting in any way.

As illustrated in FIG. 1C, imaging sensor 150 may be installed on a railroad vehicle (not shown) that is traveling over a railroad track to geometrically map the railroad track in direction 180. In this example, the movement of the railroad vehicle, imaging sensor 150, and precipitation shield device 100 may be in direction 180, and this movement in direction 180 may cause an airflow to flow in the opposite direction from direction 180. For example, an airflow including airflow 160 and airflow 162, in the opposite direction of direction 180, may flow over precipitation shield device 100. It will be appreciated that the speed of airflow 160 and airflow 162 may be related to the speed of the railroad vehicle on which imaging sensor 150 may be installed. For example, as the railroad vehicle moves faster, the speed of airflow 160 and airflow 162 may also be faster than if the railroad vehicle moves slower. It is noted that airflow 160 and airflow 162 may represent components of the airflow flowing over precipitation shield device 100. In this example, airflow 160 may represent the component of the airflow that flows immediately over surface 111, or may represent the airflow that impacts or makes contact with surface 111. Airflow 162 may represent the component of the airflow that flows over precipitation shield device 100 above airflow 160 and may not make contact with surface 111 of end wall 110.

In embodiments, surface 111 of end wall 110, may be shaped upwardly or may have an upward shape. As used herein, shaped upwardly may refer to a shape having an upward slope or an upward arcuate angle. For example, as shown in FIGS. 1A-1C, surface 111 may be shaped upwardly. In embodiments, an upward slope may a flat or linear angle extending upwardly from base 107, and an upward arcuate angle may be an arcuate angle extend upwardly from base 107.

In the example illustrated in FIG. 1C, airflow 160 and 162 may move at the same first speed before reaching surface 111 or central opening 130. In embodiments, the upward shape of surface 111 of end wall 110 may cause the speed of airflow 160 to increase once airflow 160 reaches surface 111 and flows over surface 111. In this case, the speed of airflow 160 is increased to a speed faster than the first speed. Additionally, the flow of airflow 160 is altered to an upward direction consistent with the upward shape of surface 111. On the other hand, airflow 162 remains unchanged at this point and continues flowing in the same straight trajectory and at the same first peed. Unchanged airflow 162 meets with faster airflow 160, which may also have an upward direction, over central opening 130. The difference in speed and direction of airflows 160 and 162 causes vortex 165 to be generated over central opening 130. In some embodiments, vortex 165 may have a counterclockwise direction in the illustrated perspective, due to the direction of airflows 160 and 162. As mentioned above, the pressure and force created by vortex 165 may deflect precipitation falling into central opening 130 and may prevent the precipitation from accumulating into central opening 130 and/or over window 190 of imaging sensor 130 with which central opening 130 may be aligned.

Figure 2A:
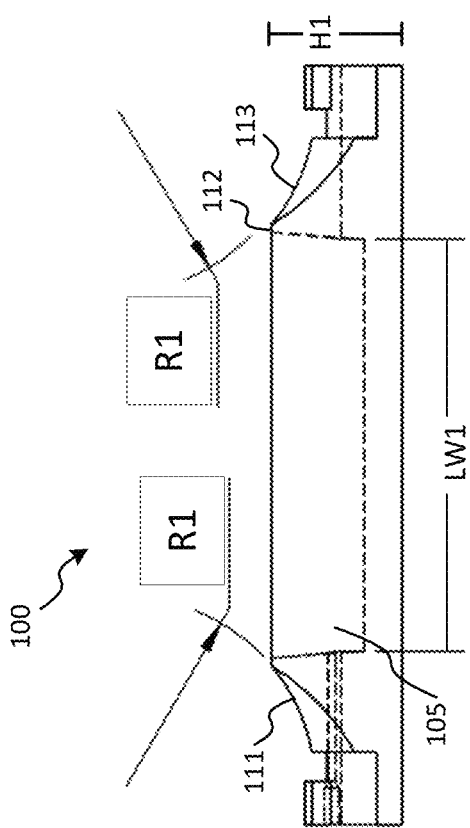
FIGS. 2A and 2B show examples of configurations of upward arcuate angles for a surface of the end walls in accordance with embodiments of the present disclosure.
Figure 2B:
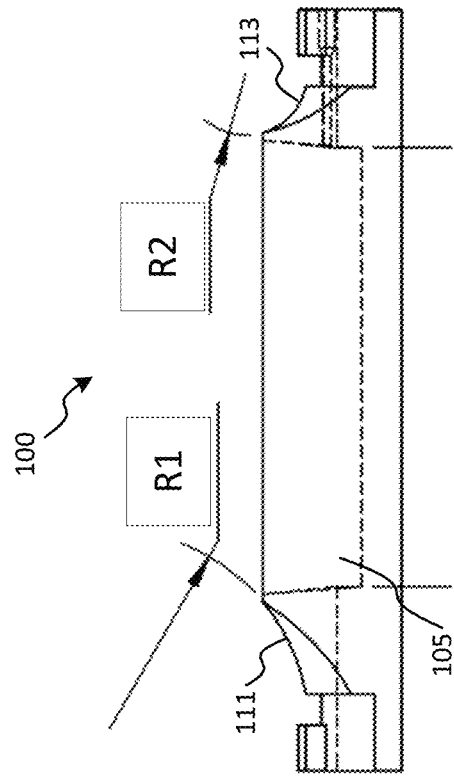

In embodiments, the upward shape of surface 111 of end wall 110 may include an upward arcuate angle of a value based on operational requirements. For example, in some embodiments, the value of the upward arcuate angle of surface 111 may be configured to ensure that a generated vortex is of sufficient pressure or force to deflect particulates of different types, such as snow, dirt particles, rain, etc. The inventors have found that an arcuate angle that is too steep (e.g., an arcuate angle with a high value) may not be able to control the airflow over the precipitation shield to generate a vortex over the central opening and may either not generate a vortex or the vortex may not be strong enough. In some embodiments, the value of the upward arcuate angle of surface 111 may be configured based on space requirements. For example, FIGS. 2A and 2B illustrate examples of configurations of upward arcuate angles for a surface of the end walls in accordance with embodiments of the present disclosure. As shown in FIG. 2A, surface 111 of shield body 105 may have an arcuate angle of value R1. In this example, surface 113 of shield body 105, which may be the surface of end wall 112, may also have an arcuate angle of value R1. In these embodiments, a vortex may be generated over the central opening of precipitation shield device 100 regardless of the direction of the airflow over precipitation shield device 100, as both end walls have a surface with the same upward arcuate angle. In embodiments, R1 may be any value for an angle generated from a circle with radius between ¼ and ¾ inches. As shown in FIG. 2B, the arcuate angles of the surface of the different end walls of shield body 105 may have different upward arcuate angle values. For example, surface 111 of shield body 105 may have an arcuate angle of value R1, and surface 113 of shield body 105 may have an arcuate angle of value R2. In some embodiments, R1 and R2 may be different values. For example, R1 may be a value for an angle generated from a circle with radius between ¼ and ¾ inches, while R1 may be a different value for an angle generated from a circle with radius between ¼ and ¾ inches.

In embodiments, configuring the least one of end walls 110 and 112 to control an airflow flowing over precipitation shield device 100 to create a vortex over central opening 130 may include adding elements onto the surface of the least one of end walls 110 and 112 that may affect the airflow flowing over precipitation shield device 100. For example, with reference back to FIG. 1C, elements, such as protrusions, cutouts, ridges, materials, etc., may be added to surface 111 of end wall 110. These added elements may be configured to affect airflow 160 to cause vortex 165 to be generated over central opening 130.

Figure 2D:
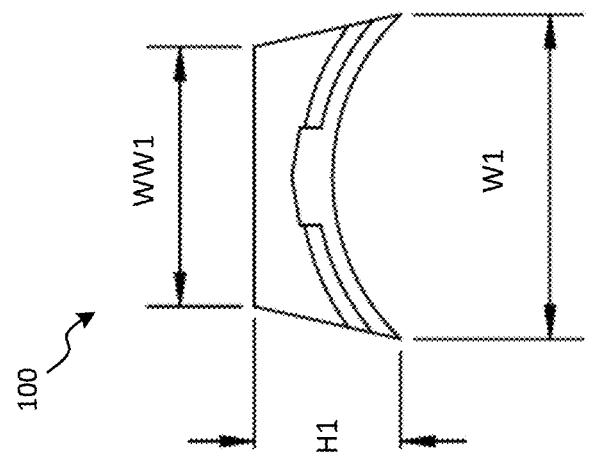
FIGS. 2C and 2D show examples of configurations of a precipitation shield device implemented in accordance with embodiments of the present disclosure.
Figure 2C:
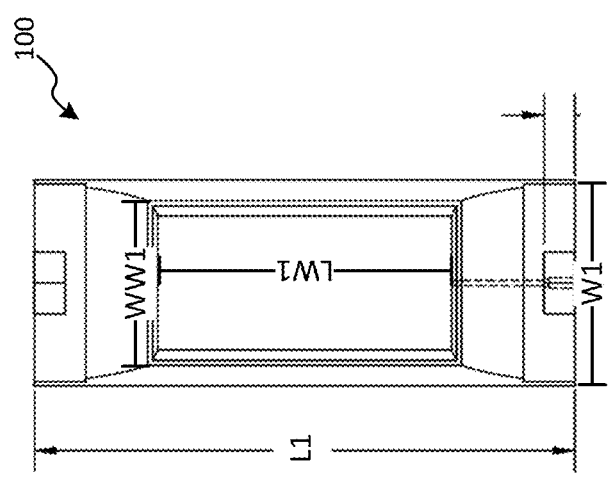

In embodiments, the dimensions of precipitation shield device 100 may be configured to provide stability and strength for precipitation shield device 100 during operation in inclement and difficult environments, and to optimize space while installed onto imaging sensor 150. In particular, the dimensions of precipitation shield device 100 may be configured to avoid interfering with operations of imaging sensor 150. FIGS. 2C and 2D show examples of configurations for dimensions of a precipitation shield device implemented in accordance with embodiments of the present disclosure. As shown in FIG. 2C precipitation shield device 100 may be configured with a length of value L1, which may be a value 6 and 7 inches. The central opening of precipitation shield device 100 may be configured to ensure coverage of a window of the imaging sensor onto which precipitation shield device 100 may be installed, but also to ensure that the imaging sensor is able to see through the window. In embodiments, the central opening of precipitation shield device 100 may have a length of value LW1 and a width of value WW1. In some embodiments, LW1 may be a value between 3 and 4 inches, and WW1 may be a value between 1.5 and 2.5 inches. As shown in FIG. 2D, a height H1 for precipitation shield device 100 may be configured and may be a height from the lowest point of precipitation shield device 100 to the highest point of the lateral walls. In embodiments, H1 may be a value configured to provide functionality in accordance with the present disclosure while also preventing interference with the visibility of imaging sensor 150. In some embodiments, H1 may be a value between 1 and 1.5 inches. Precipitation shield device 100 may be configured with a width W1 at the widest point, which may be the distance between the outer points of the bottom surface of precipitation shield device 100. In some embodiments, W1 may be a value between 2 and 3 inches.

With reference back to FIG. 1C, in embodiments, precipitation shield device 100 may be configured to receive injected air to augment vortex 165 generated over central opening 130. In embodiments, the injected air may be injected or pumped directly into central opening 130. For example, precipitation shield device 100 may be configured with an opening through at least one of the end walls 110 and 112 through which a nozzle 170 may be inserted and routed into central opening 130. In embodiments, the nozzle is inserted through the end wall that faces away from the airflow over precipitation shield device 100 during operations. For example, as shown in the example illustrated in FIG. 1C, end wall 110 may be the end wall facing the airflow over precipitation shield device 100 (e.g., airflow including airflows 160 and 162). In this case, end wall 112 may be the end wall facing away from the airflow over precipitation shield device 100. In this example, nozzle 170 may be inserted into central opening 130 through an opening in end wall 112. In some embodiments, nozzle 170 may also be inserted through ridge 141 to provide a further point of stability to nozzle 170.

In embodiments, nozzle 170 may comprise a tube and an end cap, which may cooperatively operate to inject or pump injected air 168 into central opening 130. In some embodiments, nozzle 170 can vary in size to meet a particular application. For example, in one application, nozzle 170 can be three inches (3") long, with an end cap a half-inch (½") long. In another application, nozzle 170 can be eleven-eighths inches (1⅛") long, with an end cap three-eighths of an inch (⅜") long. The end cap can be welded, glued, or otherwise coupled to nozzle 170. The end cap can have a lumen with a diameter of three-sixteenths of an inch (³⁄₁₆"), or other suitable diameter. Nozzle 170 can have a lumen with a diameter of one-eighth of an inch (⅛"), or other suitable diameter. Injected air 168 may provide a further "cushion" of air within central opening 130 that may augment vortex 165 by providing further pressure or force, directed upward from the central opening, to deflect precipitation that may fall into central opening 130. In some embodiments, nozzle 170 may be positioned at a downward angle into central opening 130 to control the flow of injected air 168 into central opening 130 to be at a downward angle. The downward angle of the flow of injected air 168 may cause injected air 168 to "bounce" off the surface of imaging sensor 150, such as off window 190, into an upward direction toward vortex 165. The upward flow of injected air 168 may augment the rotation of vortex 165 and may provide a further "boost" to vortex 165 against precipitation further improving the functionality of precipitation shield device 100 to prevent the precipitation from accumulating over window 190 of imaging sensor 150.

In embodiments, injected air 168 may be injected into central opening 130 of precipitation shield device 100 using an air injection system that may include lines 172, source 175, control 176, filter 177, and at least one control valve 178. In embodiments, source 175 may be a source of injected air 168. Source 175 may be a compressor, an air storage container, and/or any other source of pressurized air. In some embodiments, source 175 may include an existing compressed air source that is part of a railroad vehicle (e.g., a train car or an engine). For example, some railroad vehicles employ compressed air for various operations (e.g., for braking, for actuating equipment, etc.). In embodiments, source 175 may include such existing compressed air sources.

It is noted that, typically, existing compressed air sources found in railroad vehicles may be pressurized to a relatively high pounds per square inch (psi) that may exceed 70 psi. In embodiments, a control 176 may be provided to control the pressure of the compressed air provided by source 175. For example, control 176 may step down the pressure to a range between 8-10, which may be the pressure of injected air 168 when it is injected into central opening 130. In embodiments, control 176 may be configured to control the pressure of injected air 168 based on operational requirements. For example, in some embodiments, control 176 may control the pressure of injected air 168 in order to maintain vortex 165 and prevent vortex 165 from collapsing. In some embodiments, a sensor may be used to monitor vortex 165 (e.g., to monitor the effectiveness of vortex 165 for preventing accumulation of precipitation over window 190). In these cases, control 176 may determine that vortex 165 requires augmentation, or requires increased augmentation. In response to the determination that vortex 165 requires augmentation, or requires increased augmentation, control 176 may increase the pressure of injected air 168 to provide a higher pressure within central opening 130 or to provide a higher "boost" to vortex 165.

In some embodiments, control 176 may control the flow of injected air 168 into central opening 130. In embodiments, the flow of injected air 168 into central opening 130 may be continuous, in which case injected air 168 may flow into central opening 130 as long as the air injection system is on. In some embodiments, the flow of injected air 168 into central opening 130 may be intermittent, in which case injected air 168 may flow into central opening 130 during periodic, or aperiodic, intervals, but not continuously.

Filter 177 may be configured to remove moisture and/or particulates (e.g., dirt, or other particulates) from injected air 168. Removing moisture from injected air 168 may prevent moisture reaching central opening 130, which may turn into precipitation due to the cold conditions under which precipitation shield device 100 may sometimes operate. Removing particulates from injected air 168 may prevent such particulates from reaching central opening 130, which may prevent further accumulation of particulates within central opening 130 as well as maintaining lines 172 clean for carrying injected air 168 into central opening 130. In another embodiment, filter 177 can be a desiccant compressed air dryer including desiccant beads to aid in water absorption. For example, filter 177 can be a multi-stage refillable desiccant compressed air dryer, among others.

At least one control valve 178 may be provided in the air injection system of embodiments. Control valve 178 may be configured to control the flow of injected air 168. In some embodiments, control valve 178 may operate to route injected air 168 through the various lines 172 of the air injection system. Although a single line 172 is illustrated in FIG. 1C, in operation, injected air 168 is routed through multiple lines disposed throughout the railroad vehicle on which imaging sensor 130 may be installed. Control valves may be used to route injected air through the various lines. Additionally, in embodiments, more than one imaging sensor 150 may be used in a single railroad vehicle. In a typical application, a plurality of imaging sensors 150 may be used to map the geometry of a railroad track. Typically, four dual-camera sensors, one for each side of each track, may be used to map a railroad track. In these cases, a precipitation shield device 100 may be installed over each of the cameras, for a total of eight precipitation shield devices 100 in a single railroad vehicle. In these cases, multiple control valves 178 may be used to route injected air into each of the precipitation shield devices 100, while using a single air source (e.g., source 175). For example, control valve 178 may be used to route injected air 168 to central opening 130 of precipitation shield device 100 and also to route injected air to point A. In this example, point A may represent a plurality of additional precipitation shield devices.

In embodiments, lines 172 and/or nozzle 170 may be constructed from plastic, steel, brass, aluminum, copper, etc. In embodiments, lines 172 may be transparent to allow for inspection, which may facilitate determining whether moisture is present within lines 172.

Operation of precipitation shield device 100 will now be discussed with respect to FIG. 4, and with respect to FIGS. 3A and 3B, in accordance with aspects of the present disclosure.

Figure 3A:
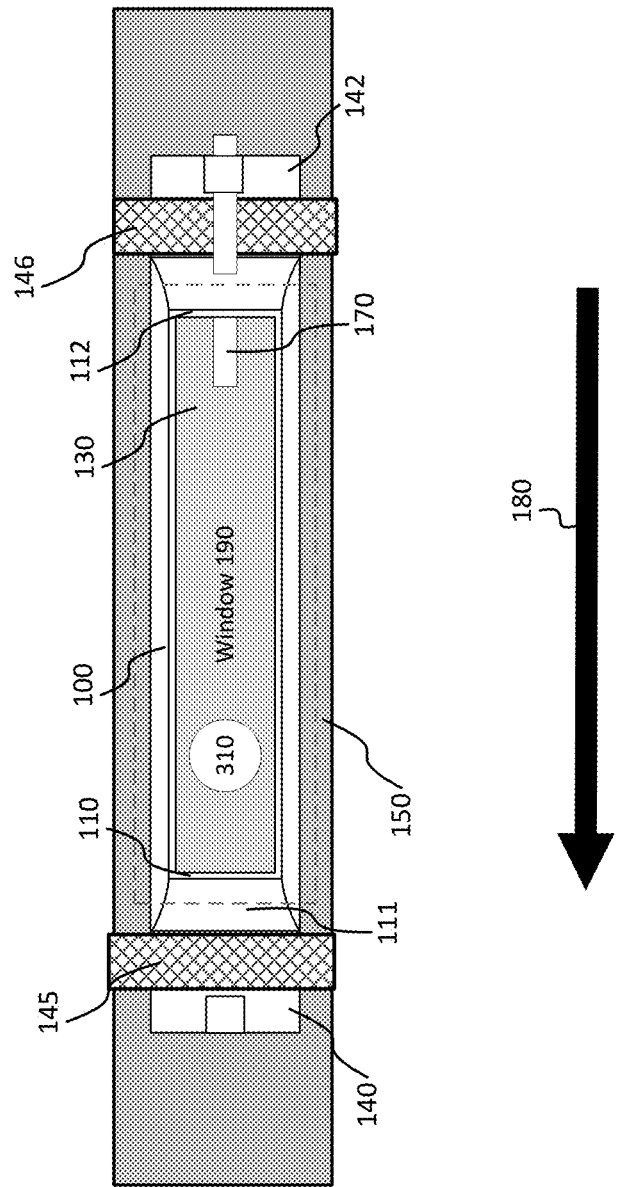
FIG. 3A shows a perspective view of a precipitation shield device during operation in accordance with aspects of the present disclosure.

FIG. 3A shows a perspective view of precipitation shield device 100 during operation in accordance with aspects of the present disclosure. FIG. 3B shows another view of precipitation shield device 100 during operation in accordance with aspects of the present disclosure. FIG. 4 shows a high-level flow diagram 400 of operation of a precipitation shield device configured in accordance with embodiments of the present disclosure for preventing accumulation of precipitation over an imaging sensor.

During operation, at block 402, precipitation shield device 100 is mounted onto imaging sensor 150. In embodiments, precipitation shield device 100 may be oriented onto imaging sensor 150 based on the expected direction of travel of the railroad vehicle onto which imaging sensor 150 is installed. In particular, precipitation shield device 100 may be mounted onto imaging sensor 150 in an orientation in which a surface of at least one end wall of the shield body of precipitation shield device 100 is facing the direction of travel such that an airflow created by the movement of the railroad vehicle hits against the surface of the at leas tone end wall. For example, the expected direction of travel may be direction 180. In this case, precipitation shield device 100 may be mounted onto imaging sensor 150 in an orientation in which surface 111 of end wall 110 of precipitation shield device 100 is facing direction 180 such that an airflow created by the movement of the railroad vehicle may hit against surface 111.

In some embodiments, precipitation shield device 100 may be mounted onto imaging sensor 150 in an orientation in which the end wall facing the direction of travel is the end wall opposite to the end wall through which an air injection nozzle is inserted into central opening 130. For example, nozzle 170 may be inserted into central opening 130 through end wall 112. In this case, precipitation shield device 100 may be mounted onto imaging sensor 150 in an orientation in which surface 111 of end wall 110, which is the end wall opposite to end wall 112, faces direction 180. In some embodiments, precipitation shield device 100 may be mounted onto imaging sensor 150 in an orientation in which the end wall facing the direction of travel is the end wall through which an air injection nozzle is inserted into central opening 130. For example, in some embodiments, precipitation shield device 100 may be mounted onto imaging sensor 150 in an orientation in end wall 112, which is the end wall through nozzle 170 is inserted into central opening 130, faces direction 180.

In embodiments, precipitation shield device 100 may be mounted onto imaging sensor 150 using tie straps 145 and 146 over mounting elements 140 and 142, respectively, at respective ends of precipitation shield device 100. In embodiments, tie straps 145 and 146 may be positioned over mounting elements 140 and 142 and may surround imaging sensor 150.

During operations, at block 404, central opening 130 may be aligned over window 190 of imaging sensor 150. For example, as shown in FIG. 3A, precipitation shield device 100 may be positioned onto imaging sensor 150 such that central opening 130 of precipitation shield device 100 may be aligned with window 190 of imaging sensor 150. In embodiments, window 190 may be a window providing protection and visibility to detector 310, which may be a camera or any other sensor. In embodiments, central opening 130 of precipitation shield device 100 may be aligned with window 190 of imaging sensor 150 so as to not interfere with or obstruct the visibility of detector 310 through window 190.

Figure 3B:
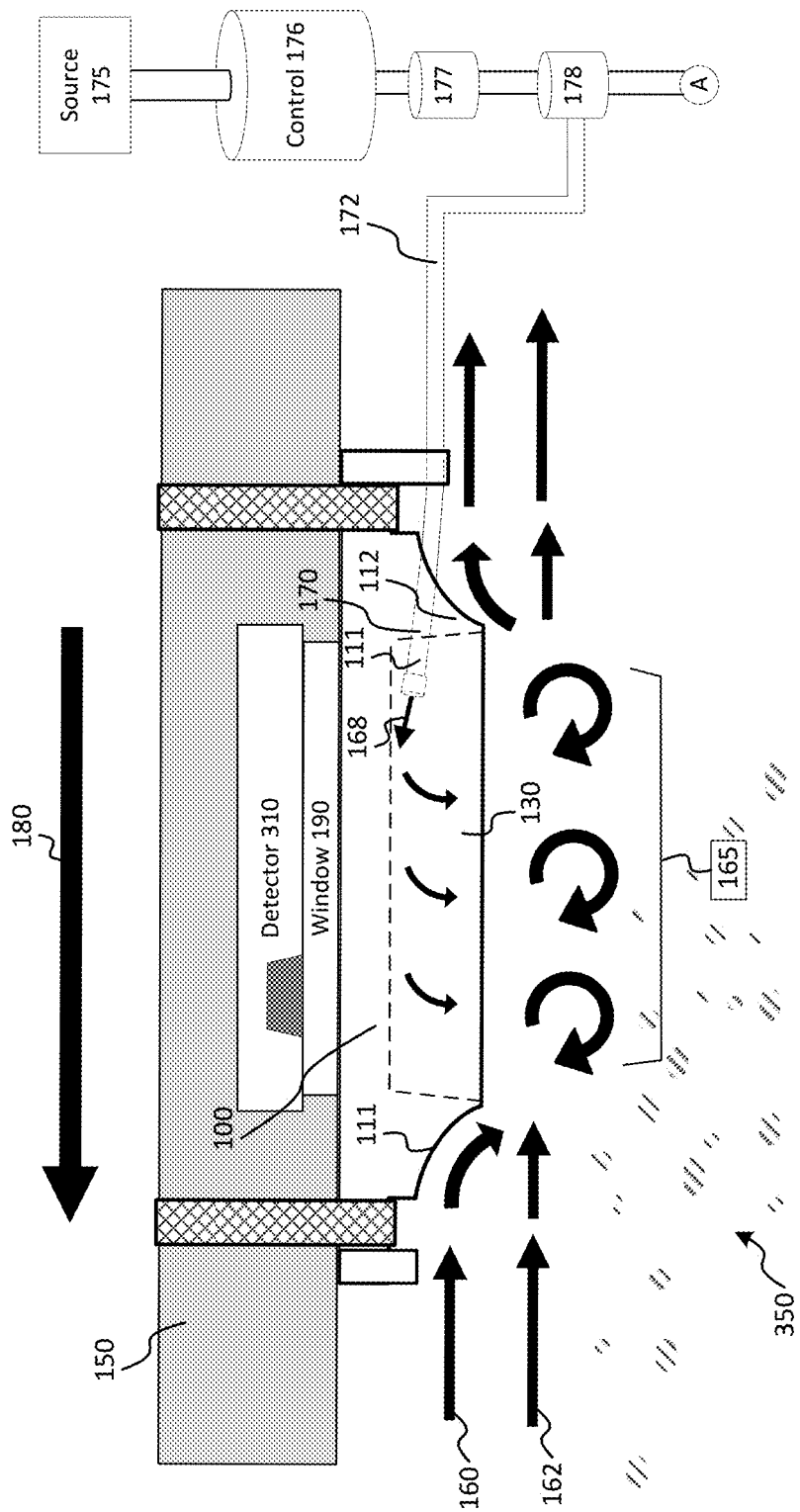
FIG. 3B shows another view of a precipitation shield device during operation in accordance with aspects of the present disclosure.
Figure 4:
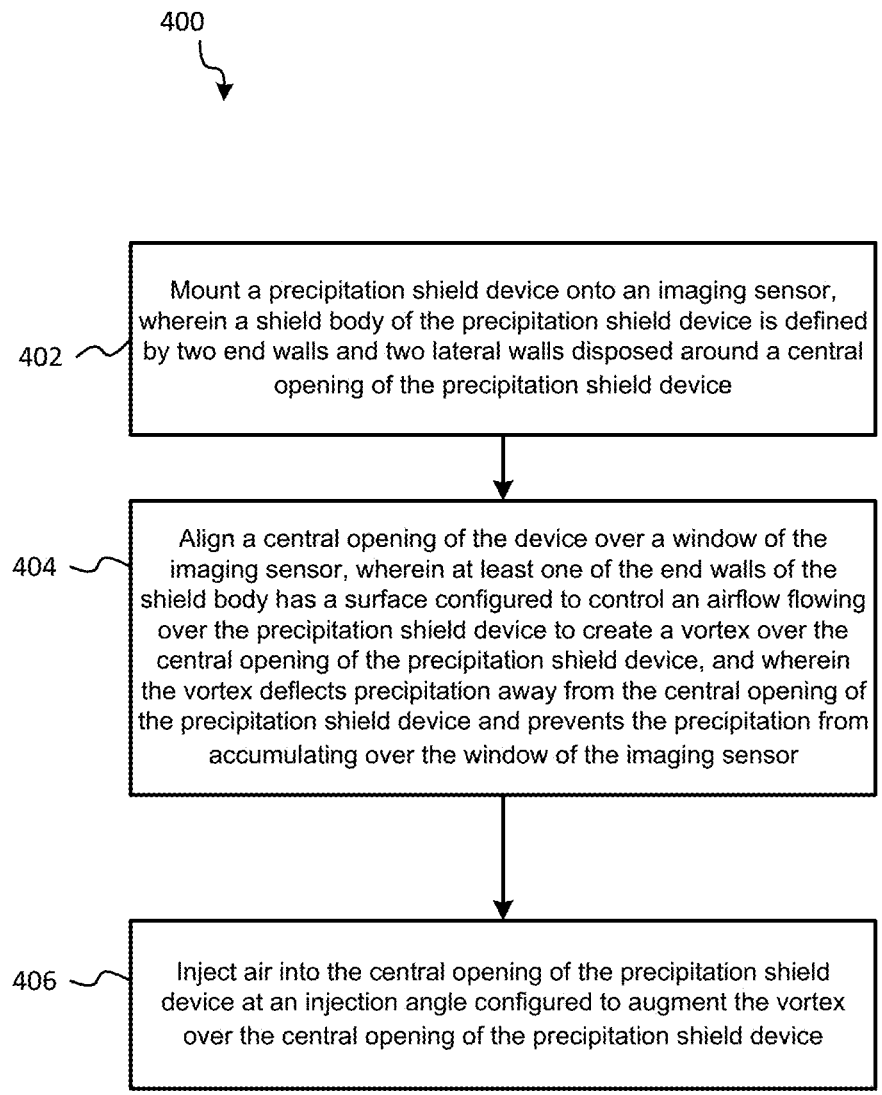
FIG. 4 shows a high-level flow diagram of operation of a precipitation shield device configured in accordance with embodiments of the present disclosure for preventing accumulation of precipitation over an imaging sensor.

In embodiments, as shown in FIG. 3B, as the railroad vehicle onto which imaging sensor 150 is installed moves in a direction 180, imaging sensor 150 and precipitation shield device 100 move in direction 180 along with the railroad vehicle. The motion in direction 180 causes an airflow to flow in the opposite direction from direction 180. For example, an airflow including airflow 160 and airflow 162, may flow in the opposite direction of direction 180 over precipitation shield device 100. In embodiments, surface 111 may be configured, in accordance with embodiments of the present disclosure, to control the airflow including airflow 160 and airflow 162 to generate a vortex over central opening 130. For example, as illustrated in FIG. 3B, surface 111 may be shaped upwardly. The upward shape of surface 111 may cause the speed of airflow 160 to increase and the direction of airflow 160 to change upwardly once airflow 160 reaches surface 111 and flows over surface 111. On the other hand, airflow 162 remains unchanged at this point and continues flowing in the same straight trajectory and at the same peed. Airflow 162 meets with airflow 160 over central opening 130 generating vortex 165 over central opening 130 due to difference in speed and direction of airflows 160 and 162. In embodiments, the pressure and force created by vortex 165 may deflect precipitation 350 away from central opening 130 and may prevent the precipitation from accumulating into central opening 130 and/or over window 190 of imaging sensor 130 with which central opening 130 may be aligned.

During operation, at block 406, air is injected into central opening 130 at an injection angle configured to augment vortex 165 over central opening 130. For example, injected air 168 may be routed from source 175, with a pressure controlled by control 176 and filtered through filter 177, by control valve 178 through pipes 172, to nozzle 170. Nozzle 170 may deliver injected air 168 into central opening 130 at a downward angle with respect to window 190 from the entry point of nozzle 170 into central opening 130. In embodiments, injected air 168 may augment vortex 165 by providing a further boost, such as further pressure or force, directed toward vortex 165 from central opening 130, to deflect precipitation 350 away from central opening 130, further improving the functionality of precipitation shield device 100 to prevent precipitation 350 from accumulating over window 190 of imaging sensor 150.

Figure 5:
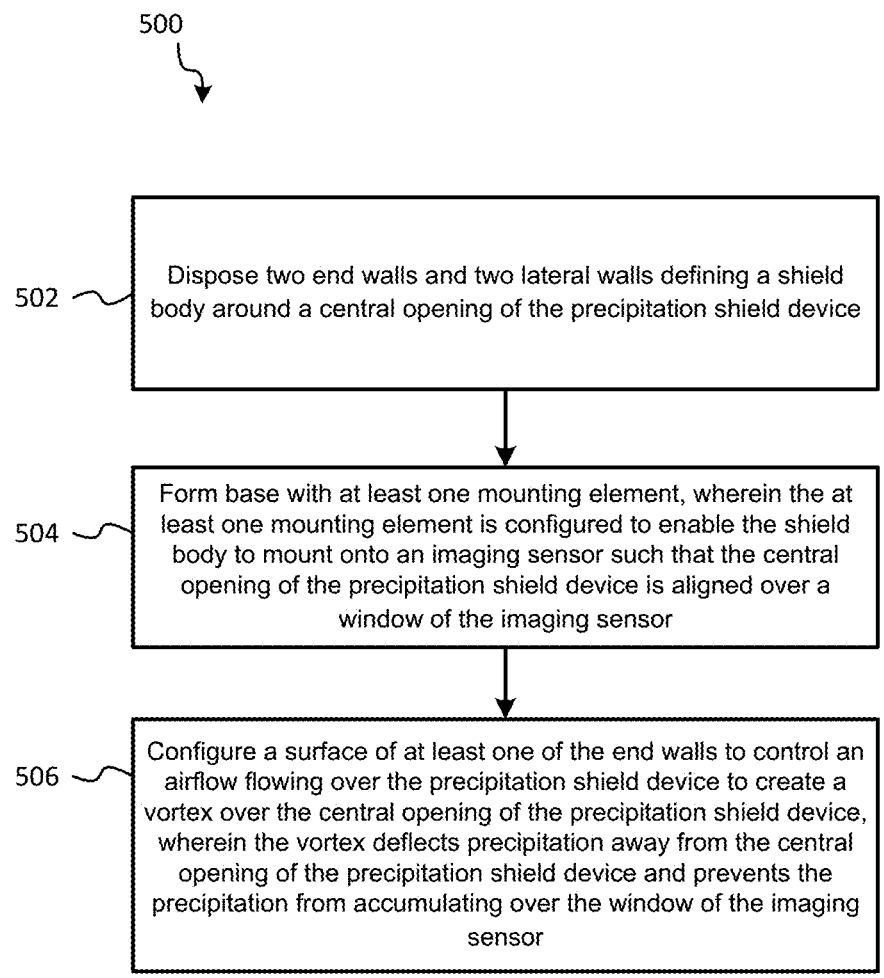
FIG. 5 shows an exemplary flow diagram of operations for manufacturing a precipitation shield device configured with functionality to prevent accumulation of precipitation over an imaging sensor in accordance with aspects of the present disclosure.

FIG. 5 shows an exemplary flow diagram of operations for manufacturing a precipitation shield device configured with functionality to prevent accumulation of precipitation over an imaging sensor in accordance with aspects of the present disclosure. For example, the steps illustrated in the example blocks shown in FIG. 5 may be performed to manufacture precipitation shield device 100 of FIGS. 1-3B, according to embodiments herein.

At block 502, two end walls and two lateral walls defining a shield body may be disposed around a central opening of a precipitation shield device, such as end walls 110 and 112 and lateral walls 120 and 122 defining shield body 105 and disposed around central opening 130 of FIGS. 1A-1C. At block 504, a base with at least one mounting element may be formed. For example, base 105 with mounting elements 140 and 142, as illustrated in FIGS. 1A-1C, may be formed. In embodiments, the at least one mounting element may be configured to enable the shield body to mount onto an imaging sensor such that the central opening of the precipitation shield device is aligned over a window of the imaging sensor.

At block 506, a surface of at least one of the end walls may be configured to control an airflow flowing over the precipitation shield device to create a vortex over the central opening of the precipitation shield device. For example, surface 111 and/or surface 113 of end walls 110 and 112, as illustrated in FIGS. 1A-1C, may be configured to control an airflow flowing over precipitation shield device 100 to generate vortex 165 over central opening 130 of the precipitation shield device 100. In embodiments, the vortex may deflect precipitation away from the central opening of the precipitation shield device and prevents the precipitation from accumulating over the window of the imaging sensor.

In embodiments, configuring the surface of the at least one of the end walls may be configured to control an airflow flowing over the precipitation shield device to create a vortex over the central opening of the precipitation shield device may include shaping the surface of the at least one end wall with an upward shape. The upward shape of the surface of the at least one end wall may alter one or more of a speed and direction of a first airflow flowing on the surface of the at least one end such that when the first airflow combines with a second airflow flowing above first airflow, the vortex is generated over the central opening.

In embodiments, a nozzle may be inserted into the central opening of the precipitation shield device through at least one of the end walls. In embodiments, the nozzle may be configured to inject air into the central opening of the precipitation shield device at an injection angle configured to augment the vortex over the central opening of the precipitation shield device.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Moreover, the description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the disclosures can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A precipitation shield device, comprising:
    a shield body defined by two end walls and two lateral walls disposed around a central opening of the precipitation shield device; and
    a base configured to support the shield body and configured to facilitate mounting of the precipitation shield device onto an imaging sensor such that the central opening of the precipitation shield device is aligned over a window of the imaging sensor,
    wherein at least one of the end walls has a surface comprising a shape that is configured to:
        control an airflow flowing over the precipitation shield device; and
        create a vortex over the central opening of the precipitation shield device,
    wherein the vortex deflects precipitation away from the central opening of the precipitation shield device and prevents the precipitation from accumulating over the window of the imaging sensor.

2. The precipitation shield device of claim 1, wherein the shied body and the base are of a unitary construction.

3. The precipitation shield device of claim 1, wherein the base includes one or more mounting elements configured to receive one or more fastening components, the one or more fastening components configured engage the one or more mounting elements and the imaging sensor to secure the precipitation shield device to the imaging sensor.

4. The precipitation shield device of claim 1, wherein the surface configured to control the airflow flowing over the precipitation shield device has an upward shape.

5. The precipitation shield device of claim 4, wherein the upward shape of the surface configured to control the airflow flowing over the precipitation shield device includes one of:
    a flat upward slope; or
    an arcuate angle.

6. The precipitation shield device of claim 4, wherein the upward shape of the surface is configured to alter one or more of a speed and direction of a first airflow component of the airflow flowing over the precipitation shield, wherein the first airflow component includes air contacting the surface configured to control the airflow flowing over the precipitation shield device.

7. The precipitation shield device of claim 6, wherein the first airflow component has a speed and direction that is different from a second airflow component of the airflow flowing over the precipitation shield, wherein the second airflow component includes air flowing above the first airflow component, and wherein the first airflow component and the second airflow component combine over the central opening and generate the vortex.

8. The precipitation shield device of claim 1, further comprising a nozzle configured to inject air into the central opening of the precipitation shield device at an injection angle configured to augment the vortex over the central opening of the precipitation shield device.

9. The precipitation shield device of claim 1, wherein the imaging sensor is part of a railroad asset mapping laser system mounted onto a railroad vehicle.

10. The precipitation shield device of claim 1, further comprising:
    inserting a nozzle into the central opening of the precipitation shield device through at least one of the end walls, wherein the nozzle is configured to inject air into the central opening of the precipitation shield device at an injection angle configured to augment the vortex over the central opening of the precipitation shield device.

11. A method of manufacturing a precipitation shield device, comprising
    disposing two end walls and two lateral walls defining a shield body around a central opening of the precipitation shield device;
    forming a base with at least one mounting element, wherein the at least one mounting element is configured to enable the shield body to mount onto an imaging sensor such that the central opening of the precipitation shield device is aligned over a window of the imaging sensor; and
    configuring a shape of a surface of at least one of the end walls to control an airflow flowing over the precipitation shield device and to create a vortex over the central opening of the precipitation shield device, wherein the vortex deflects precipitation away from the central opening of the precipitation shield device and prevents the precipitation from accumulating over the window of the imaging sensor.

12. The method of claim 11, wherein configuring the surface of at least one of the end walls to control the airflow flowing over the precipitation shield device includes:
    shaping the surface of at least one of the end walls with an upward shape.

13. The method of claim 12, wherein shaping the surface of at least one of the end walls with the upward shape includes one of:
- shaping the surface of at least one of the end walls with a flat upward slope; or
- shaping the surface of at least one of the end walls with an arcuate angle.

14. The method of claim 12, wherein the upward shape of the surface is configured to alter one or more of a speed and direction of a first airflow component of the airflow flowing over the precipitation shield, wherein the first airflow component includes air contacting the surface configured to control the airflow flowing over the precipitation shield device.

15. The precipitation shield device of claim 14, wherein the first airflow component has a speed and direction that is different from a second airflow component of the airflow flowing over the precipitation shield, wherein the second airflow component includes air flowing above the first airflow component, and wherein the first airflow component and the second airflow component combine over the central opening and generate the vortex.

16. A method of preventing accumulation of precipitation over an imaging sensor, comprising:
- mounting a precipitation shield device onto an imaging sensor, wherein a shield body of the precipitation shield device is defined by two end walls and two lateral walls disposed around a central opening of the precipitation shield device;
- aligning a central opening of the precipitation shield device over a window of the imaging sensor, wherein at least one of the end walls of the shield body has a surface comprising a shape that is configured to control an airflow flowing over the precipitation shield device and to create a vortex over the central opening of the precipitation shield device, and wherein the vortex deflects precipitation away from the central opening of the precipitation shield device and prevents the precipitation from accumulating over the window of the imaging sensor; and
- injecting air into the central opening of the precipitation shield device at an injection angle configured to augment the vortex over the central opening of the precipitation shield device.

17. The method of claim 16, wherein mounting the precipitation shield device onto the imaging sensor the includes:
- attaching one or more fastening components onto one or more mounting elements of the precipitation shield device, the one or more fastening components configured engage the one or more mounting elements and the imaging sensor to secure the precipitation shield device to the imaging sensor.

18. The method of claim 16, wherein the surface configured to control the airflow flowing over the precipitation shield device has an upward shape.

19. The method of claim 18, wherein the upward shape of the surface configured to control the airflow flowing over the precipitation shield device includes one of:
- a flat upward slope; or
- an arcuate angle.

20. The method of claim 16, wherein injecting air into the central opening of the precipitation shield device at the injection angle includes:
- injecting air into the central opening of the precipitation shield device through a nozzle running through at least one of the end walls into central opening and configured to inject compressed air into the central opening at the injection angle configured to augment the vortex over the central opening.

* * * * *